United States Patent
Fu

(10) Patent No.: US 11,183,171 B2
(45) Date of Patent: Nov. 23, 2021

(54) METHOD AND SYSTEM FOR ROBUST LANGUAGE IDENTIFICATION

(71) Applicant: BEIJING DIDI INFINITY TECHNOLOGY AND DEVELOPMENT CO., LTD., Beijing (CN)

(72) Inventor: Tianxiao Fu, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 183 days.

(21) Appl. No.: 16/525,719

(22) Filed: Jul. 30, 2019

(65) Prior Publication Data

US 2019/0355345 A1    Nov. 21, 2019

Related U.S. Application Data

(63) Continuation of application No. PCT/CN2017/084755, filed on May 17, 2017.

(51) Int. Cl.
*G10L 15/00*    (2013.01)
*G10L 15/02*    (2006.01)
(Continued)

(52) U.S. Cl.
CPC .......... *G10L 15/005* (2013.01); *G10L 15/02* (2013.01); *G10L 15/04* (2013.01); *G10L 15/063* (2013.01); *G10L 15/16* (2013.01); *G10L 15/22* (2013.01)

(58) Field of Classification Search
None
See application file for complete search history.

(56) References Cited

U.S. PATENT DOCUMENTS 7,664,642 B2 *   2/2010  Espy-Wilson .......... G10L 15/08
                                                   704/254
9,449,598 B1 *   9/2016  Rastrow ................ G10L 15/193
(Continued)

FOREIGN PATENT DOCUMENTS

CN    103065622 A    4/2013
CN    106297769 A    1/2017
(Continued)

OTHER PUBLICATIONS

International Search Report in PCT/CN2017/084755 dated Feb. 23, 2018, 5 Pages.

(Continued)

*Primary Examiner* — Satwant K Singh
(74) *Attorney, Agent, or Firm* — Finnegan, Henderson, Farabow, Garrett & Dunner LLP

(57) ABSTRACT

The present disclosure relates to a method and system for robust and efficient language identification. The method includes: receiving the speech signal; partitioning the speech signal into a plurality of audio frames; extracting features of the plurality of audio frames; determining, using a neural network, a variable associated with the language identity and one or more auxiliary attributes of the speech signal, for each of the plurality of audio frames; determining scores of the plurality of audio frames based on the extracted features; and determining the language identity of the speech signal based on the variables and scores determined for the plurality of audio frames.

17 Claims, 6 Drawing Sheets

(51) Int. Cl.
*G10L 15/04* (2013.01)
*G10L 15/06* (2013.01)
*G10L 15/16* (2006.01)
*G10L 15/22* (2006.01)

(56) References Cited

U.S. PATENT DOCUMENTS

| | | | |
|---|---|---|---|
| 9,640,186 B2* | 5/2017 | Fousek | G10L 19/02 |
| 9,653,093 B1* | 5/2017 | Matsoukas | G10L 15/08 |
| 9,818,409 B2* | 11/2017 | Senior | G10L 15/02 |
| 9,818,410 B2* | 11/2017 | Sak | G06N 3/0445 |
| 2003/0233233 A1 | 12/2003 | Hong | |
| 2013/0238336 A1 | 9/2013 | Sung et al. | |
| 2015/0058012 A1* | 2/2015 | Chopra | G10L 15/02 |
| | | | 704/236 |
| 2016/0026912 A1 | 1/2016 | Falcon et al. | |
| 2016/0063991 A1* | 3/2016 | Chopra | G10L 15/16 |
| | | | 704/249 |
| 2017/0025119 A1* | 1/2017 | Song | G10L 15/16 |

FOREIGN PATENT DOCUMENTS

| | | |
|---|---|---|
| CN | 106598937 A | 4/2017 |
| TW | I411973 B | 10/2013 |

OTHER PUBLICATIONS

Written Opinion in PCT/CN2017/084755 dated Feb. 23, 2018, 5 pages.

\* cited by examiner

METHOD AND SYSTEM FOR ROBUST LANGUAGE IDENTIFICATION

CROSS-REFERENCE TO RELATED APPLICATIONS

This application is a continuation of International Application No. PCT/CN2017/084755, filed on May 17, 2017, which is incorporated herein by reference in its entirety.

TECHNICAL FIELD

The present disclosure relates generally to automatic language identification, and more particularly, to a method and system for robust and efficient language identification.

BACKGROUND

Automatic Speech Recognition (ASR) has been a fast-growing area in recent years. There have been developments in single and multi-language ASR systems that performs language identification (LID) given an utterance of spoken text, based on language specific attributes. Various modeling techniques, such as Gaussian mixture and Hidden Markov Models (HMM), have been proposed for application in ASR systems used for language identification.

Automatic language identification technologies can be applied in various areas. For example, it may improve user experience regarding device control and manipulation. User speaking different languages may be able to input voice commands to operate their terminals. It may also be used by service providers to accommodate customers speaking different languages, either through remote phone call assistance, or delivery of personal service by employees speaking the same language as the customer. Many services and products are now offered through remote communication between a user terminal and a service provider server. In cab service context, a customer speaking a particular language may initiate a phone conversation with the cab service provider to request cab service. An automatic LID system may promptly identify the language type, and the phone call may be transferred to customer service personnel who speak the same language, to better accommodate the customer's service needs, thus improving customer experience.

For example, when a foreign customer is calling for cab service, if the cab service provider could identify the language the customer is speaking, such as German, the call can be then forwarded to a customer service representative speaking German. This will better facilitate understanding and processing of the service request. For example, the cab service provider may then be able to dispatch an available driver speaking German to arrange pick up. Further, for markets such as mainland China, people speaking different local dialects may have difficulty understanding each other. If a cab service provider can identify the dialect a customer is speaking, and then forward the customer request to a service representative speaking the same dialect, the customer may have much better service experience. In addition, the language identification result may also be stored and associated with the customer account, for future service reference, customer profiling purposes, and for conducting market analysis.

However, the large-scale application of the state-of-art LID systems is hindered by their high error rate. For example, it is challenging for a machine to preciously distinguish similar attributes or elements shared among different languages, or dialects of the same language. Moreover, different languages, such as those sharing the same ancient source, may share similar vocabulary, sounds, or structural compositions. For example, Danish is largely mutually intelligible with Norwegian and Swedish, as they originate from the same source and share much similarity with each other. Further, one language may have various local dialects, which share certain basic language elements, vocabulary, or structural compositions, but may vary in other aspects. These subtle differences make it difficult to improve the accuracy and efficiency of language identification.

In view of the above problems, this disclosure provides language identification methods, apparatuses, and systems for robust language identification.

SUMMARY

One aspect of the present disclosure is directed to a method for determining a language identity corresponding to a speech signal. The method includes: receiving the speech signal; partitioning the speech signal into a plurality of audio frames; extracting features of the plurality of audio frames; determining, using a neural network, a variable associated with the language identity and one or more auxiliary attributes of the speech signal, for each of the plurality of audio frames; determining scores of the plurality of audio frames based on the extracted features; and determining the language identity of the speech signal based on the variables and scores determined for the plurality of audio frames.

Another aspect of the present disclosure is directed to a system for determining a language identity corresponding to a speech signal. The system includes a memory including instructions. The system also includes a processor configured to execute the instructions to: receive the speech signal; partition the speech signal into a plurality of audio frames; extract features of the plurality of audio frames; determine, using a neural network, a variable associated with the language identity and one or more auxiliary attributes of the speech signal, for each of the plurality of audio frames; determine scores of the plurality of audio frames based on the extracted features; and determine the language identity of the speech signal based on the variables and scores determined for the plurality of audio frames.

Yet another aspect of the present disclosure is directed to a non-transitory computer-readable storage medium storing instructions that, when executed by one or more processors, cause the processors to perform a method for determining a language identity corresponding to a speech signal. The method includes: receiving the speech signal; partitioning the speech signal into a plurality of audio frames; extracting features of the plurality of audio frames; determining, using a neural network, a variable associated with the language identity and one or more auxiliary attributes of the speech signal, for each of the plurality of audio frames; determining scores of the plurality of audio frames based on the extracted features; and determining the language identity of the speech signal based on the variables and scores determined for the plurality of audio frames.

DETAILED DESCRIPTION

As used in the present disclose, "languages" for identification may include languages that are mutually unintelligible (such as Chinese, English, Spanish, etc.), dialects (such as mandarin versus Cantonese), and accents (such as British accent versus American accent). As such, the disclosed language-identification method and system may identify the language(s), dialect(s), and/or accent(s) represented by an audio signal.

This disclosure relates to a method and system for robust language identification. As described in more detail below, the disclosed method and system partitions a received audio signal into multiple audio frames and employs multi-task machine learning to improve the accuracy of determining acoustic features in the audio frames. Moreover, the disclosed method and system assigns confidence values, or scores, to the multiple audio frames, and gives more weights to the audio frames with higher scores in determining the language represented by the audio signal.

Figure 1:
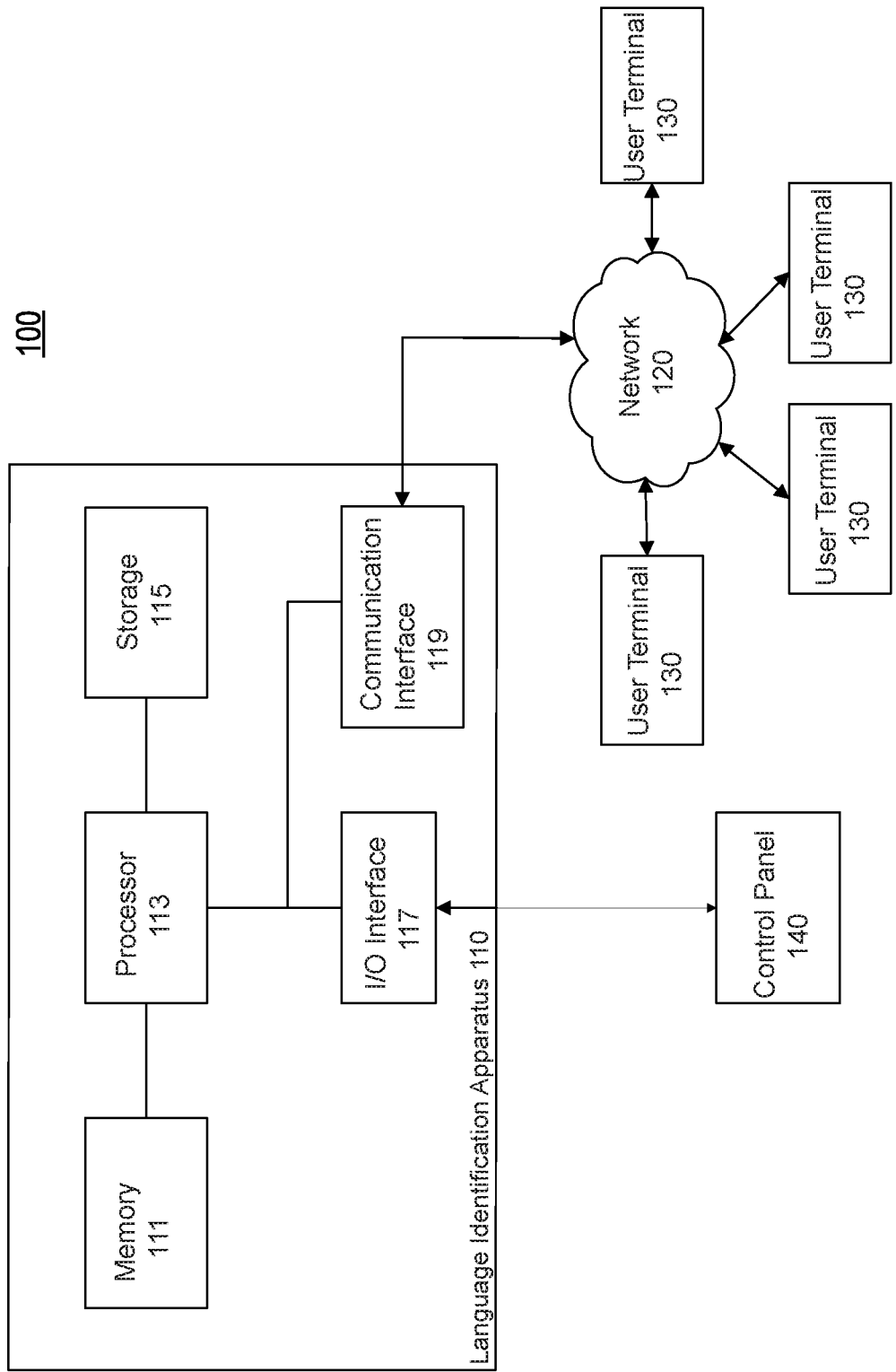
FIG. 1 is a block diagram of a language identification system, according to an exemplary embodiment.

FIG. 1 is a block diagram of a language identification system 100 according to an exemplary embodiment. Referring to FIG. 1, system 100 may include a language identification apparatus 110, a network 120, a plurality of user terminals 130, and a control panel 140.

Language identification apparatus 110 may be configured to identify a language corresponding to a series of audio signal input, based on the features extracted from the speech signals included therein. As shown in FIG. 1, language identification apparatus 110 may include, among other things, a memory 111, a processor 113, a storage 115, an input/output (I/O) interface 117, and a communication interface 119. At least some of these components of language identification apparatus 110 may be configured to transfer data, and send or receive instructions between or among each other. In some embodiments, language identification apparatus 110 may be installed as part of a control panel 140, or as part of a service management system, such as a cab service management platform. In some other embodiments, its functions may also be embodied as part of a cab service application which can be installed on a user terminal.

Processor 113 may include any appropriate type of general-purpose or special purpose microprocessor, digital signal processor, or microcontroller. Processor 113 may be configured as a separate processor module dedicated to identifying a language and outputting a result of the identification process. Alternatively, processor 113 may be configured as a shared processor module for performing other functions unrelated to language identification.

Processor 113 may be configured to receive data and/or signals from other components of system 100 to perform language identification. For example, processor 113 may exchange information with control panel 140 via, for example, I/O interface 117, to receive instructions and output identification result. After identification, processor 113 may also receive instructions from control panel 140, to perform functions such as storing the identification result in a database, updating user account record, or further outputting the identification result to a corresponding user terminal 130.

Processor 113 may also access information transmitted through communication interface 119. For example, processor 113 may receive an audio recording of a speech utterance from a user terminal 130, or a communication between two different user terminals 130, transmitted through network 120. After identifying the language corresponding to the input audio signals, processor 113 may, upon receiving instructions from the control panel 140, transmit the identification result to the corresponding user terminal 130 via network 120.

Processor 113 may execute computer instructions (e.g., program codes) stored in memory 111 and/or storage 115, and may perform functions in accordance with exemplary embodiments described in this disclosure. More exemplary functions of processor 113 will be described later in relation to FIGS. 2-6.

Memory z111 and storage 115 may include any appropriate type of mass storage provided to store any type of information that processor 113 may need to operate. Memory 111 and storage 115 may be manifested in a volatile or non-volatile, magnetic, semiconductor, tape, optical, removable, non-removable, or other type of storage device or tangible (i.e., non-transitory) computer-readable medium including, but not limited to, a read-only memory (ROM), a flash memory, a dynamic random-access memory (RAM), and a static RAM. Memory 111 and/or storage 115 may be configured to store one or more computer programs that may be executed by processor 113 to perform the disclosed methods described herein for language identification.

Memory 111 and/or storage 115 may be further configured to store information and data used by processor 113. For example, memory 111 and/or storage 115 may store the audio recordings received from user terminals 130, and data generated during the language identification process, and the ultimate identification result.

I/O interface 117 may be configured to facilitate the communication between language identification apparatus 110 and control panel 140. For example, as noted above, language identification apparatus 110 may provide the identification result to control panel 140 via I/O interface 117, for updating customer profiles, or record keeping. Language identification apparatus 110 may also receive instructions from control panel 140 regarding performance of language identification, or for further outputting the identification result to a corresponding user terminal 130.

Communication interface 119 may be configured to communicate with user terminals 130 via network 120. Network 120 may be any type of wired or wireless network that may allow transmitting and receiving data. For example, network 120 may be a wired network, a local wireless network (e.g., Bluetooth™, WIFI, near field communications (NFC), etc.), a cellular network, an Internet, or the like, or a combination thereof. Other known communication methods which provide a medium for transmitting data are also contemplated.

[0028] User terminal 130 may be any device capable of receiving and transmitting information through network 120, for example, a mobile phone with a cab service application, a computer such as laptop or desktop, personal digital assistants (PDAs), tablets, smart watches, etc. User terminal 130 may be configured to receive and record audio signals and transmit information through network 120. For example, a user may input information through an application on his or her mobile phone, initiate or participate in a conversation with another user terminal 130. The mobile phone functions as a user terminal 130 that receives an audio recording of speech utterances, which may then be transmitted to language identification apparatus 110 for language identification. In cab service context, user terminals 130 may also include passenger terminals and driver terminals, both capable of receiving audio signal input and transmit the same to language identification apparatus 110 via network 120.

User terminal 130 may further include a display including an LCD, an LED, a plasma display, or any other type of display, and provide a Graphical User Interface (GUI) presented on the display for user input and data display. For example, in cab service context, passenger and driver account information may be displayed through the display on their respective terminals, and the language identification result may also be displayed.

Control panel 140 may further include a plurality of components, and may serve as part of a comprehensive management system of a service provider which keeps record of the 110 via I/O interface 117, to send instructions, and receive identification result, etc. In cab service context, it may further include other components such as a database storing language identification result corresponding to the customer, a processor for processing orders and dispatching an available driver capable of communicating with the customer in the identified language, or transferring the customer order to service personnel capable of communicating with the customer in the identified language and providing requested service or information. Other components and their functions not directly related to language identification are not described in detail herein.

Figure 2:
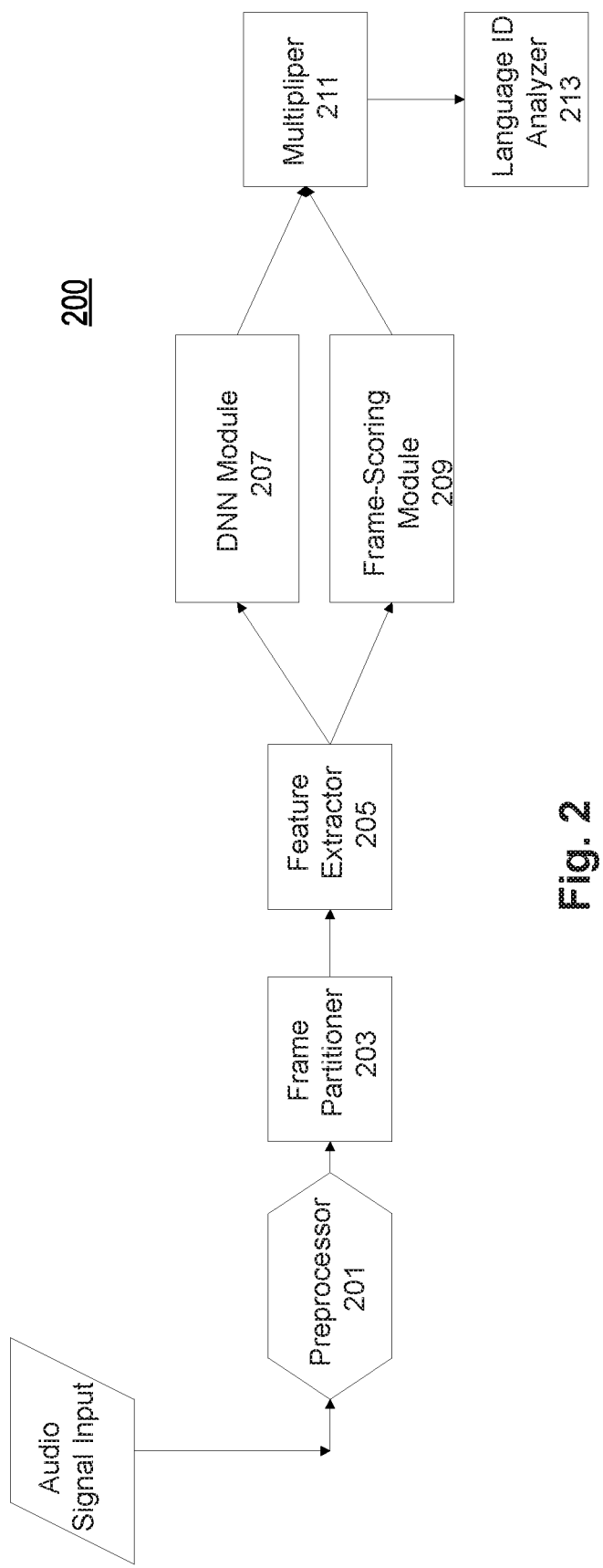
FIG. 2 is a block diagram of a language identification apparatus, according to an exemplary embodiment.

FIG. 2 is a block diagram of a language identification apparatus 200 according to an exemplary embodiment. As shown in FIG. 2, language identification apparatus 200 may include preprocessor 201, frame partitioner 203, feature extractor 205, Deep Neural Network (DNN) module 207, frame-scoring module 209, multiplier 211, and language ID analyzer 213.

Preprocessing module 201 is configured to preprocess a speech signal received form a user terminal 130. The preprocessing may include removing ambient noise or background noise from the speech signal, and/or removing silent or unvoiced portions of the speech signal. If speech signals from multiple user terminals are present, preprocessing may further include selecting a speech signal corresponding to a particular user terminal 130 based on information such as, channel information, terminal information, or gender information included in the corresponding user profile.

Frame partitioner 203 is configured to partition the preprocessed speech signal into a plurality of audio frames, for further processing of each audio frame. As further described below with reference to FIG. 3, the frame size and frame shift may vary depending on the speech utterance content and length, or system configurations.

Feature extractor 205 is configured to extract features from each frame. Mathematically, the features extracted from a frame a multi-dimensional feature vector. Various existing feature extraction techniques used in speech or speaker recognition technologies may be used. For example, feature extraction module may be configured to extract Mel Frequency Cepstral Coefficients (MFCCs), which are widely used in speech recognition, others may include i-vectors, filter-bank features, Linear Prediction Coefficients then be input into DNN module 207, specifically, to the feature input layer of DNN. Further, depending on the potential target languages, different acoustic features that reflect different characteristics of the speech signals may be extracted by DNN module 207.

In some embodiments, multiple features may be used together as DNN feature input. For example, in some embodiments, both filter-bank features and i-vectors may be extracted by feature extractor 205, and used as DNN input. Filter-banks are a commonly-used feature extraction technique. A filter-bank is an array of band-pass filters which divides the input signal to a plurality of components representing respective frequency sub-bands. Each component then becomes one dimension of a feature vector.

I-vector can also be extracted as an additional input to DNN module 207. I-vector extraction was originally developed for speaker recognition or verification tasks. In i-vector frameworks, a low-dimensional space is constructed, and each utterance is represented by a low-dimensional feature vector named i-vector. I-vector may be speaker-specific, and does not vary from frame to frame. It provides the speaker characteristic to DNN and allows it to adapt itself accordingly.

Figure 6:
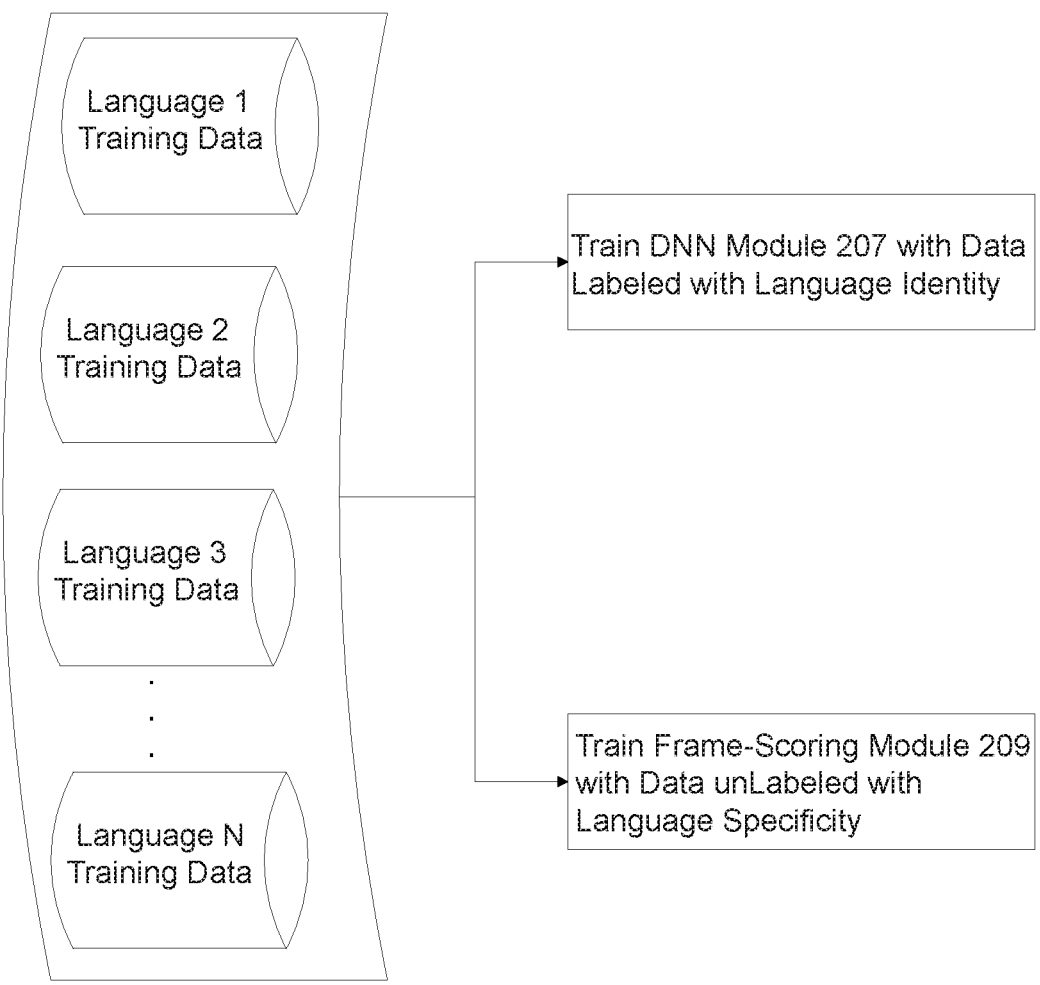
FIG. 6 is a schematic diagram illustrating training of a DNN module and a frame-scoring module used in the language identification apparatus of FIG. 2, according to an exemplary embodiment.

DNN module 207 is configured to obtain a language identification (ID) probability distribution, namely, the likelihoods of the audio frame corresponding to each of a plurality of languages. It may be trained with data of multiple target languages, as shown in FIG. 6. A DNN is an artificial neural network with multiple hidden layers between the input and output layers. Features extracted for each frame by feature extractor 205 are input into the feature input layer. The number of hidden layers between the input and output layer may vary. Parameters of each hidden layer may be learned and adapted during the training stage. A DNN may include one or more softmax layers, outputting probability distribution over the senones modeled by DNN. Senones of different languages may be included in the same softmax layer. In some other embodiments, each softmax layer may be language specific, namely, senones of each language may be included in a respective softmax layer corresponding to that particular language. In some embodiments, the neural network employed by DNN module 207 may be a Convolutional Neural Network (CNN). CNN may be considered as one sub-type of DNN. A CNN uses convolutional and pooling layers, the convolutional layer being the key building block that undertakes most of the computation. In a CNN, the neurons in a hidden layer will only be connected to a small region of the layer before it, instead of all of the neurons in a fully-connected manner in traditional neural networks. CNNs also use the concept of shared weights and biases, which may greatly reduce the number of parameters involved, compared to the fully-connected neural networks. CNNs further use the concept of pooling. Pooling layers are usually used immediately after convolutional layers, and are used to simplify the information in the output from the convolutional layer. In language identification area, compared to other types of neural networks, CNNs have been shown to be more robust against noise distortions and channel distortions.

Further, DNN module 207 may also perform multi-task learning, where DNN is trained for multiple tasks, i.e., producing multiple types of output. DNN learns one main task, which may be generating language ID probability distribution. The DNN may also be trained for one or more auxiliary tasks, such as determining channel information, speaker information, or noise information associated with the speech signal. Multi-task learning can be a very useful technique to increase recognition or identification accuracy, without requiring input of extra data. Where auxiliary tasks are wisely selected, multi-task learning may help improve robustness of the language identification system, and achieve better identification performance.

In some embodiments, while obtaining language ID probability distribution by extracting language identification related attributes, as the main task, DNN module 207 may also extract other auxiliary attributes, such as attributes related to channel of the signal, microphone attributes, signal background or environment, speaker gender information, or the distance between the vocal organs, such as mouth or nose, to the microphone. Channel attributes refer to the transmission medium of the input signal, for example, the input signal may be transmitted by different telecommunication service providers, such as AT&T® or T-Mobile®. The input signal may also be input through a particular microphone. Auxiliary attributes related to the microphone may include the model of microphone, manufacturer, sound quality, noise level, etc. Further, auxiliary attributes may also include information about the background environment of the signal input, reflecting where the signal was obtained, such as from a device located inside a vehicle, at home, or on street. For example, features of the background noise included in the audio signal obtained in different environment may be different. Gender information of the speaker may be another useful auxiliary attribute, as speech signals from different genders may include different fundamental frequencies. In addition, the distance between the sound source, or vocal organs of the speaker, and the microphone may be another useful auxiliary attribute. While DNN module 207 may not ultimately output the results of the auxiliary attributes together with the language identification result, the simultaneous determining of the language identity and the auxiliary attributes enables the DNN to improve the accuracy of the language identification (i.e., the main task), for example, by tuning the generated language ID probability distribution based on the discerned non-language identification related attributes.

In some embodiments, during training, multi-task learning may be implemented by configuring the DNN to include one identification output which corresponds to the language model construction, and an auxiliary output reflecting the auxiliary attributes. The auxiliary output may then be fed back to adjust the model parameters by reducing or removing the effect of the auxiliary attributes of the input speech signal.

Frame-scoring module 209 determines a score for each audio frame based on the extracted features of the audio frame. As explained in more detail below, the score represents a weight given to each audio frame in determining the language identity of the speech signal. Consistent with the disclosed embodiments, different languages may use different sounds/utterances, phonemes, tones, letters, stresses, certain grammatical, phonological, or stylistic elements, or other characteristics that distinguish one languages from others. Frame-scoring 209 may assign a corresponding score to each audio frame based on whether the frame includes such language-specific characteristics. For example, if the extracted features included in an audio frame is not language specific, or commonly shared by different languages, the audio frame may not be considered as significant in language identification, and thus may be assigned a low score/weight.

For example, certain sounds, vocalized pauses such as "um", "er," and "uh," or pronunciation of certain words such as "mom," may not be used exclusively in one specific language, but rather spoken in very similar ways. Audio frames including sound elements such as these may not be very helpful in identifying what language is spoken. In other words, the language identity determined based on these audio frames may be reliable. As such, these audio frames may accordingly be allocated a relatively lower or no score/weight. In contrast, some sound elements may only be used in one specific language, or a very limited number of languages. Audio frames including such differentiating sound elements may be more significant and discriminative in terms of language identification. For example, the phoneme /r/, written as ř (r-hacek), may be a sound unique to the Czech language, and may be very difficult to pronounce for foreign speakers. Some Arabic sounds may only exist in Arabic languages. Further, phonemic tones are found in some languages such as Mandarin Chinese, and different dialects of Chinese may have variations of tones attached to the pronunciations of the same characters. Audio frames including these differentiating sound elements may be assigned a higher weight, since these are more helpful in identifying the language spoken.

In the disclosed embodiments, frame-scoring module 209 may also be trained with a large amount of language data corresponding to a plurality of different languages, such that it may accurately assign a corresponding score/weight to an audio frame. In one embodiment, during training, frame-scoring module 209 may take the features extracted from the training data and determine the statistical distribution of the extracted features among the plurality of languages. A regression analysis may then be performed to fit a scoring function from the statistical distribution. The scoring functions measures the features' degree of language specificity. That is, if statistically certain features only appear in the training data of a particular language, the features are given the highest score; if statistically certain features are shared by a small group of different languages, the features are given a modest score; and if statistically certain features are shared by a large number of different languages, the features are given a low score. As such, in the language-identification stage, the trained scoring function may be used by frame-scoring module 209 to compute scores for audio frames based on the features extracted from the audio frames.

In another embodiment, for training data corresponding to each of the plurality of different languages, the features, or feature vectors, extracted from multiple audio frames are clustered into one or more clusters using any suitable clustering technique, such as K-means clustering method. The one or more clusters form a "feature library" for each of the plurality of languages. In the language-identification stage, a "distance function" may be used to determine the extent at which the features, or feature vectors, extracted from an audio frame can be classified into one of the clusters. A scoring function, such as a Softmax function, may then be used to compute a score based on the extent. In particular, if the extracted features falls in one of the clusters, frame-scoring module 209 may conclude the audio frame is language specific and assign a high score to the audio frame. Conversely, if the extracted features cannot be classified into one of the clusters, frame-scoring module 209 may conclude the audio frame is not language specific and assign a low score to the audio frame. The features (e.g., second features) clustered into one or more clusters may be the same or different from the features (e.g., first features) used in regression analysis Multiplier 211 multiplies the language ID probability distribution outputted by DNN module 207 with the score outputted by frame-scoring module 209, to compute a weighted language ID probability distribution of each frame.

Language ID analyzer 213 is configured to generate a language identification result based on the weighted language ID distributions of the plurality of audio frames. Specifically, language ID analyzer 213 may determine an average of the weighted language ID distributions over the plurality of audio frames, and select the language with the highest probability to be output as the identified language.

As described above, the score computed for each audio frame is the weight given to the frame in the process of determining the language ID of the speech signal. The score serves as a confidence value indicating the reliability of the language ID probability distribution determined from each frame. Therefore, scoring the frames improves the robustness of the language identification.

Figure 3:
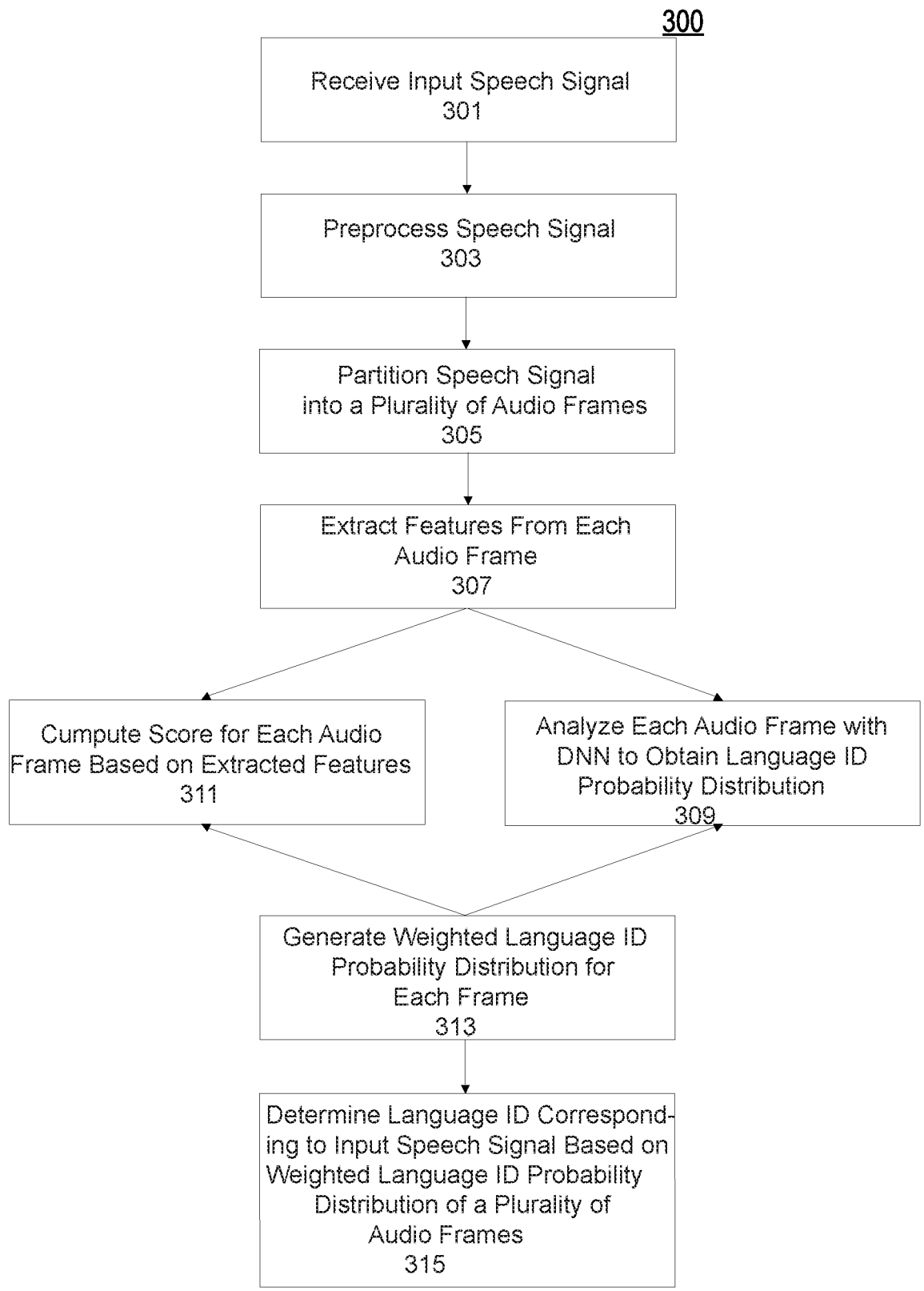
FIG. 3 is a flowchart illustrating a language identification method, according to an exemplary embodiment.

FIG. 3 is a flowchart illustrating a language identification method 300, according to an exemplary embodiment. For example, method 300 may be performed by language identification apparatus 200 as shown in FIG. 2. Referring to FIG. 3, method 200 includes the following steps 301-315.

Step 301, language identification apparatus 200 receives a input speech signal. As explained above with reference to FIG. 1, the input speech signal may be transmitted through network 120 from user terminal 130. For example, in cab service context, user terminal 130 may be used to catch the speech utterances by a driver or a passenger. For example, user terminal 130 may be a mobile phone used by a passenger. The passenger may use an application installed on the mobile phone to request a cab service, report an issue, or request user account record information. The mobile phone may serve as the user terminal 130, to receive a speech signal recording the user's speech utterance, which will then be transmitted to language identification apparatus 200 via network 120. As another example, when used by a driver, user terminal 130 may be used to record a conversation between the driver and a passenger, and transmit the conversation recording to language identification apparatus 200 for identifying the language spoken by the passenger.

Step 303, preprocessor 201 preprocesses the received speech signal. As explained above with reference to FIG. 2, preprocessing may include filtering background or ambient noise from the speech signal, extracting (i.e., removing unvoiced or silent portions) of speech signal, detecting gender(s) of the speaker(s), etc. The preprocessing makes the speech signal "cleaner," and thereby reduces the workload on the subsequent language identification. For example, a silent portion of the speech signal is where no speech is produced, and a unvoiced portion of the speech signal is where the waveform of the speech signal is random or aperiodic in nature as the voice chords do not vibrate. Removing the silent and/or unvoiced portions makes method 300 more efficient. As another example, in the machine-learning stage of method 300, the gender information may be used to better set the parameters of the learning models.

Step 305, after the speech signal is preprocessed, frame partitioner 203 partitions the speech signal into a plurality of overlapping audio frames. The size of each frame and frame shift may vary, depending on the quality, length, and content of signal, or system requirements. A frame has to be long enough for the characteristics of the speech signal to be stationary or substantially constant. For example, a window size of 20-30 ms may provide a good trade-off between frequency resolution and stationarity of the speech signal in a speech frame. Frame shift may usually be fixed at about half of the frame size. That said, particular selection of frame size and frame shift may often be application-specific. The present disclosure does not limit the manner how the speech signal is partitioned.

Step 307, feature extractor 205 extracts features of each frame. As explained above with reference to FIG. 2, different features may be extracted as input to DNN module 207, such as filter-bank features, MFCC features, and i-vectors, details of which are not repeated herein.

Step 309, the features extracted from each frame in step 307 are input to DNN module 207 for determining probabilities of one or more languages. As described above with reference to FIG. 2, DNN module 207 learns the input features with a machine-learning model trained with language data corresponding to a plurality of languages. The machine-learning module may be a DNN. The output of the DNN analysis is language ID probability distribution corresponding to each frame. In some embodiments, the DNN may be a multitask CNN, which determines not only the language ID probability distribution but also other attributes, i.e., auxiliary attributes, of the speech signal. Although results of the other attributes may not be ultimately outputted by DNN module 207, incorporating the auxiliary tasks in the CNN learning process may improve the accuracy of the CNN's main task, i.e., determining the language ID probability distribution.

Step 311, the features extracted from each frame in step 307 are also transmitted to frame-scoring module 209 for computing a score or weight for the corresponding frame. Details of the frame scoring are described above with respect to FIG. 2, which are not repeated herein.

Step 313, based on the score and the generated language ID probability distribution determined for each frame, language identification apparatus 200 generates a weighted language ID probability distribution of each frame. As explained above with the reference to FIG. 2, this may be performed by multiplier 211.

Step 315, after weighted language ID probability distributions of the plurality of frames are generated in step 313, language ID analyzer 213 combines the results and determines language identification of the speech signal. Specifically, in some embodiments, language ID analyzer 213 may compute an average of the weighted language ID probability distribution over the plurality of frames, and select the language associated with the highest weighted probability as the output of method 300.

Figure 4:
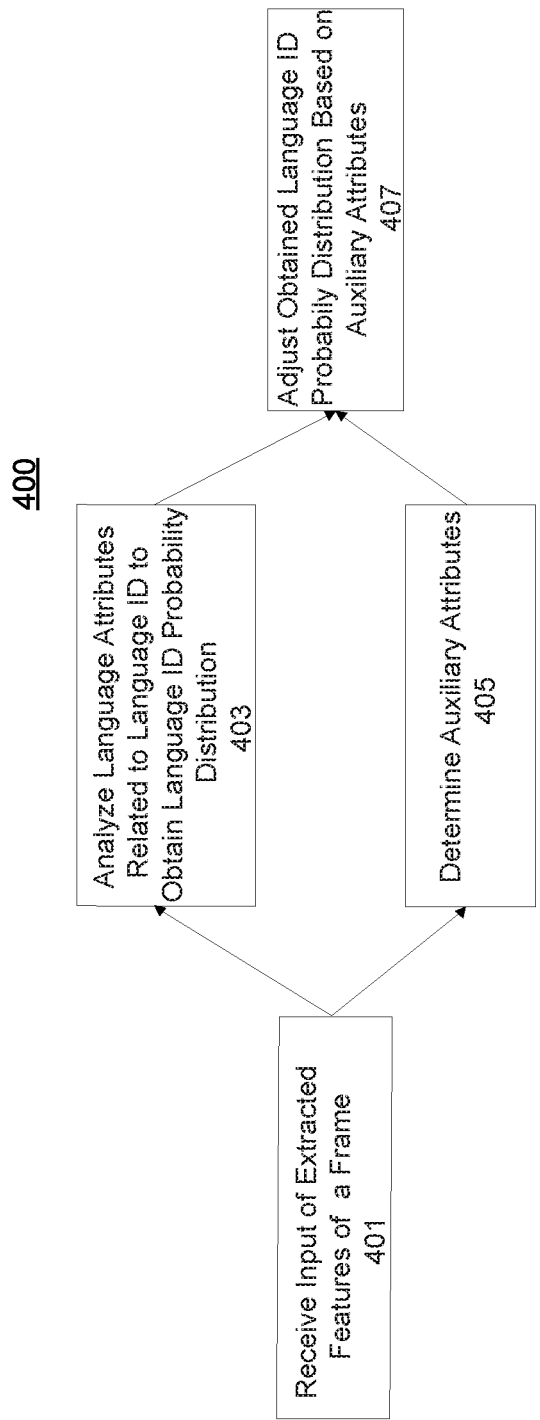
FIG. 4 is a flowchart illustrating a Deep Neural Network (DNN) analysis process, according to an exemplary embodiment.

FIG. 4 is a flowchart illustrating a DNN analysis process 400, according to an exemplary embodiment. Consistent with the disclosed embodiments, process 400 corresponds to step 309 of language identification method 300, and may be performed by language identification apparatus 200.

Step 401, DNN module 207 receives the features extracted by feature extractor 205 from an audio frame.

Step 403, as a main task of the DNN analysis, DNN module 207 learns the extracted features to determine a language ID probability distribution associated with the frame.

Step 405, as auxiliary tasks of the DNN analysis, DNN module 207 may also include extracting auxiliary attributes, not directly related to but may affect generation of language ID probability distribution, such as speaker gender, channel of the signal, etc., as described above with reference to FIG. 2, details of which are not repeated herein.

Step 407, DNN module 207 adjusts the determined language ID probability distribution based on the auxiliary attributes. For example, may include removing the effect of the auxiliary attributes on, and thereby improving the accuracy of, determining the language ID probability distribution. For example, in some embodiments, multitask learning may be implemented to regularize training by jointly predict acoustic models and clean features, which has been shown to improve acoustic models trained on noisy data. Specifically, a multi-task learning may be incorporated by configuring the network to have two outputs, one predicting the acoustic models, the other predicting clean features for denoising purposes. The multi-task learning component may be manifested in two fully-connected DNN layers followed by a linear output layer. These layers are only used during training and may be discarded afterwards. During training, the gradients back propagated from the two outputs are weighted respectively. In some other embodiments, DNN module 207 may comprise two DNNs, one DNN performs auxiliary tasks, such as estimating trigrapheme posterior probabilities, the result of which are then fed into the second DNN, as additional input for language identification.

Figure 5:
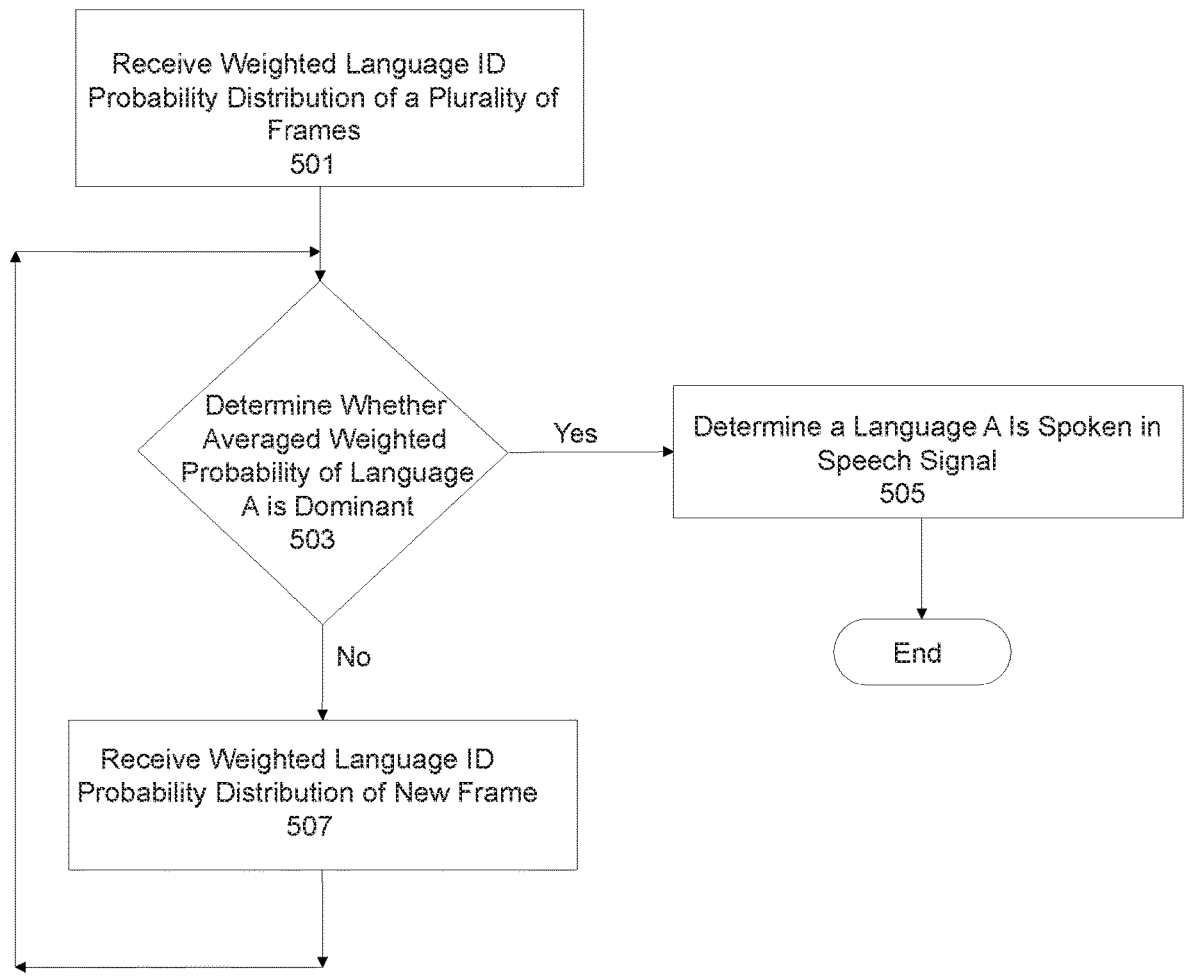
FIG. 5 is a flowchart illustrating a language identification determination process, according to an exemplary embodiment.

FIG. 5 is a flowchart illustrating a language identification determination process 500, according to an exemplary embodiment. Consistent with the disclosed embodiments, process 500 may correspond to step 315 of method 300, and may be performed by language ID analyzer 213 of language identification apparatus 200.

Step 501, language ID analyzer 213 receives weighted language ID probability distributions of a plurality of audio frames, from multiplier 211.

Step 503, language ID analyzer 213 may determine whether the probability of a language is dominant. Specifically, language ID analyzer 213 may compute an average of the weighted language ID probability distributions over the plurality of audio frames. Language ID analyzer 213 may compare the language with the highest averaged weighted probability, e.g., "language A," against a pre-set probability. If the highest averaged weighted probability is higher than or equal to the pre-set probability, language ID analyzer 213 proceeds to step 505. Otherwise, step 507 is executed. In step 505, language ID analyzer 213 determines that language A is the language spoken in the input speech signal and ends the language identification process. In step 507, language ID analyzer 213 receives the weighted language ID probability distribution of a new audio frame, and returns to step 503.

According to process 500, no more audio frames from a speech signal after language ID analyzer 213 determines the averaged weighted probability corresponding to a certain language is dominant. This way, the computational load may be reduced without compromising the identification accuracy.

FIG. 6 is a schematic diagram illustrating training of DNN module 207 and a frame-scoring module 209. Referring to FIG. 6, both DNN module 207 and frame-scoring module 209 are trained with a large amount of language data corresponding to a plurality of potential target languages i.e., language 1, 2, . . . N. Training of DNN module 207 involves inputting language data labeled with the respective language identities. For example, if DNN module 207 employs a DNN, the input layer of the DNN receives the labeled training data. The DNN then processes the labeled training data using various weights and functions in the hidden layers, and compares the output against the known language identification. Errors are then propagated back through the DNN, which then adjusts the weights accordingly, and the process occurs repeatedly and the weights are updated and refined each time. Different algorithms have been proposed to for DNN training, the most popular one being back-propagation algorithm. As noted above, in some embodiments, during training, multi-task learning techniques may be incorporated to assist in regularizing DNN for better modeling performance.

Still referring to FIG. 6, since the language specificity of the training date is unknown, frame-scoring module 209 cannot be trained with data labeled with the degree of language specificity. As described above, in one embodiment, a regression analysis may be performed on the language identities and the features extracted from training data corresponding to different languages, so as to fit a scoring function for computing a score based on the extracted features. In another embodiment, for training data corresponding to each language, features may be extracted and clustered into one or more clusters. After that, an audio frame can be scored based on the extent at which the features, or feature vectors, extracted from the audio frame can be classified into one of the clusters.

Another aspect of the disclosure is directed to a non-transitory computer-readable medium storing instructions which, when executed, cause one or more processors to perform the language identification methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

Through the language identification methods, apparatuses and systems disclosed herein, language identification may be more robustly determined. The techniques disclosed herein may be used in various areas. For example, in cab service context, if a customer calls and requests service in a certain language, the system may promptly identify the language spoken by the customer, and better accommodate the customer's needs by dispatching a driver speaking the same language for pick up, or transferring the request to a customer representative capable of speaking the same language to process the customer request. Further, the system may store the language identification result in the corresponding customer profile, for future references and other statistics analysis.

It will be apparent to those skilled in the art that various modifications and variations can be made to the disclosed language identification system and related methods. Other embodiments will be apparent to those skilled in the art from consideration of the specification and practice of the disclosed language identification system and related methods. It is intended that the specification and examples be considered as exemplary only, with a true scope being indicated by the following claims and their equivalents.

What is claimed is:

1. A method for determining a language identity corresponding to a speech signal, comprising:
   receiving the speech signal;
   partitioning the speech signal into a plurality of audio frames;
   extracting features of the plurality of audio frames;
   determining, using a neural network, a variable associated with the language identity and one or more auxiliary attributes of the speech signal, for each of the plurality of audio frames;
   determining scores of the plurality of audio frames based on the extracted features; and determining the language identity of the speech signal based on the variables and scores determined for the plurality of audio frames by:
  computing a weighted average of the variables based on the scores of the plurality of audio frames; and
  determining the language identity of the speech signal based on the weighted average.

2. The method of claim 1, wherein the variable indicates a probability associated with the language identity.

3. The method of claim 1, wherein the auxiliary attributes correspond to one or more of speaker gender, distance between a sound source and a microphone, background information, noise condition, channel information, or microphone information.

4. The method of claim 1, wherein the neural network is a convolutional neural network.

5. The method of claim 1, wherein the extracted features include filter-bank (FBANK) features, i-Vectors, or Mel-Frequency Cepstral Coefficients (MFCCs).

6. The method of claim 1, wherein determining the scores of the plurality of audio frames based on the extracted features includes:
  extracting features from training data corresponding to a plurality of languages;
  performing a regression analysis on the features extracted from the training data and language identities of the training data;
  constructing a scoring function based on the regression analysis; and
  determining the scores of the plurality of audio frames based on the scoring function.

7. The method of claim 1, wherein determining the scores of the plurality of audio frames based on the extracted features includes:
  extracting features from training data corresponding to a plurality of languages;
  clustering the features extracted from the training data into a plurality of clusters;
  performing classification of the extracted features of the plurality of audio frames into the plurality of clusters; and
  determining the scores of the plurality of audio frames based on the classification.

8. A system for determining a language identity corresponding to a speech signal, the system comprising:
  a memory including instructions; and
  a processor configured to execute the instructions to:
  receive the speech signal;
  partition the speech signal into a plurality of audio frames;
  extract features of the plurality of audio frames;
  determine, using a neural network, a variable associated with the language identity and one or more auxiliary attributes of the speech signal, for each of the plurality of audio frames;
  determine scores of the plurality of audio frames based on the extracted features; and
  determine the language identity of the speech signal based on the variables and scores determined for the plurality of audio frames by:
    computing a weighted average of the variables based on the scores of the plurality of audio frames; and
    determining the language identity of the speech signal based on the weighted average.

9. The system of claim 8, wherein the variable indicates a probability associated with the language identity.

10. The system of claim 8, wherein the auxiliary attributes correspond to one or more of speaker gender, distance between a sound source and a microphone, background information, noise condition, channel information, or microphone information.

11. The system of claim 8, wherein the neural network is a convolutional neural network.

12. The system of claim 8, wherein the extracted features include filter-bank (FBANK) features, i-Vectors, or Mel-Frequency Cepstral Coefficients (MFCCs).

13. The system of claim 8, wherein the processor is further configured to execute the instructions to:
  extract features from training data corresponding to a plurality of languages;
  perform a regression analysis on the features extracted from the training data and language identities of the training data;
  construct a scoring function based on the regression analysis; and
  determine the scores of the plurality of audio frames based on the scoring function.

14. The system of claim 8, wherein the processor is further configured to execute the instructions to:
  extract features from training data corresponding to a plurality of languages;
  cluster the features extracted from the training data into a plurality of clusters;
  perform classification of the extracted features of the plurality of audio frames into the plurality of clusters; and
  determine the scores of the plurality of audio frames based on the classification.

15. A non-transitory computer-readable medium storing instructions that, when executed by one or more processors, cause the processors to perform a method for determining a language identity corresponding to a speech signal, the method comprising:
  receiving the speech signal;
  partitioning the speech signal into a plurality of audio frames;
  extracting features of the plurality of audio frames;
  determining, using a neural network, a variable associated with the language identity and one or more auxiliary attributes of the speech signal, for each of the plurality of audio frames;
  determining scores of the plurality of audio frames based on the extracted features; and
  determining the language identity of the speech signal based on the variables and scores determined for the plurality of audio frames by:
    computing a weighted average of the variables based on the scores of the plurality of audio frames; and
    determining the language identity of the speech signal based on the weighted average.

16. The non-transitory computer-readable medium of claim 15, wherein determining the scores of the plurality of audio frames based on the extracted features includes:
  extracting features from training data corresponding to a plurality of languages;
  performing a regression analysis on the features extracted from the training data and language identities of the training data;
  constructing a scoring function based on the regression analysis; and
  determining the scores of the plurality of audio frames based on the scoring function.

17. The non-transitory computer-readable medium of claim 15, wherein determining the scores of the plurality of audio frames based on the extracted features includes:

extracting features from training data corresponding to a plurality of languages;
clustering the features extracted from the training data into a plurality of clusters;
performing classification of the extracted features of the plurality of audio frames into the plurality of clusters; and
determining the scores of the plurality of audio frames based on the classification.

* * * * *